(12) United States Patent
Yamamoto

(10) Patent No.: US 12,302,369 B2
(45) Date of Patent: May 13, 2025

(54) CONTROL METHOD, CONTROL APPARATUS, AND STORAGE MEDIUM

(71) Applicant: CANON KABUSHIKI KAISHA, Tokyo (JP)

(72) Inventor: Tetsuya Yamamoto, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 363 days.

(21) Appl. No.: 17/750,462

(22) Filed: May 23, 2022

(65) Prior Publication Data
US 2022/0400491 A1 Dec. 15, 2022

(30) Foreign Application Priority Data

Jun. 10, 2021 (JP) .................................. 2021-097466

(51) Int. Cl.
*H04W 72/53* (2023.01)
*H04L 5/14* (2006.01)
*H04W 72/044* (2023.01)

(52) U.S. Cl.
CPC ............... *H04W 72/53* (2023.01); *H04L 5/14* (2013.01); *H04W 72/044* (2013.01)

(58) Field of Classification Search
CPC . H04W 72/53; H04W 72/044; H04W 72/541; H04W 72/0446; H04L 5/14
See application file for complete search history.

(56) References Cited

U.S. PATENT DOCUMENTS

| | | | |
|---|---|---|---|
| 10,004,020 B2 | 6/2018 | Yamamoto | |
| 2013/0094387 A1* | 4/2013 | Susitaival | H04W 72/542 370/252 |
| 2014/0160967 A1 | 6/2014 | Gao | |
| 2015/0003272 A1* | 1/2015 | Hu | H04W 24/02 370/252 |
| 2015/0373550 A1 | 12/2015 | Hong | |
| 2016/0302218 A1* | 10/2016 | Behravan | H04W 72/12 |
| 2020/0008087 A1 | 1/2020 | Papaleo et al. | |
| 2023/0269771 A1* | 8/2023 | Cimpu | H04W 74/0816 370/329 |

FOREIGN PATENT DOCUMENTS

| | | |
|---|---|---|
| JP | 2015-515842 A | 5/2015 |
| WO | 2020/067989 A1 | 4/2020 |

OTHER PUBLICATIONS

Notice of Reasons for Refusal issued by the Japanese Patent Office on Feb. 28, 2025 in corresponding JP Patent Application No. 2021-097466, with English translation.

* cited by examiner

*Primary Examiner* — Steven Hieu D Nguyen
(74) *Attorney, Agent, or Firm* — Carter, DeLuca & Farrell LLP

(57) ABSTRACT

In a case where, in a first network, a first pattern, in which each of time division duplex (TDD) time slots is assigned to uplink or downlink Which is a direction of communication between a base station and a terminal, is used and, in a second network that is different from the first network, the first pattern and a second pattern that is different from the first pattern in assignment of the direction of communication to the time slots can be used for communication by TDD between a base station and a terminal, a control apparatus controls, based on that a predetermined condition has been satisfied, a base station belonging to the second network so as to use time slots in which the direction of communication that has been assigned coincides between the first and the second patterns.

14 Claims, 6 Drawing Sheets

FIG. 2

| TIME SLOT NUMBER | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| SYNCHRONOUS TDD PATTERN | D | D | D | S | U | U | D | D | D | D | D | D | D | S | U | U | D | D | D | D |
| SEMI-SYNCHRONOUS TDD PATTERN | D | D | D | S | U | U | D | S | U | U | D | D | D | S | U | U | D | S | U | U |

RADIO FRAME

| BASE STATION ID | FREQUENCY BAND TO BE USED | TDD PATTERN | NEIGHBORING BASE STATION ID |
|---|---|---|---|
| 104 | 4.6 GHz | SYNCHRONOUS | 105, 106 |
| 105 | 4.6 GHz | SEMI-SYNCHRONOUS | 106, 104 |
| 106 | 4.7 GHz | SEMI-SYNCHRONOUS | 104, 105 |

CONTROL METHOD, CONTROL APPARATUS, AND STORAGE MEDIUM

BACKGROUND OF THE INVENTION

Field of the Invention

The present invention relates to a technique for suppressing interference between wireless communication networks.

Description of the Related Art

The fifth generation (5G) cellular communication standard standardized by the third generation partnership project (3GPP) has been put into practical use. In 5G, in addition to networks that telecommunications carriers deploy nationwide, local 5G in which networks can be deployed by regional bodies and companies other than telecommunications carriers is available. In addition, regional BWA (Broadband Wireless Access) is also known as a network that can be deployed by regional bodies and companies other than telecommunications carriers. In the following, a network deployed nationwide by a telecommunications carrier may be called a carrier network, and a network, such as local 5G or regional BWA, may be called a local network.

In an environment in which different networks such as a carrier network and a local network coexist, it is necessary to prevent communication of a network, such as a local network which has a relatively low priority, from interfering with communication of a preferred network, such as a carrier network. For example, if a carrier network is communicating using a time division duplex (TDD) and a local network performs downlink communication in a time slot where uplink communication is being performed in the carrier network, a signal from a base station of the local network may interfere with a base station of the carrier network. On the other hand, a local network can suppress the occurrence of interference by synchronizing with a carrier network and synchronizing time slots in which uplink communication and downlink communication are performed. However, it is envisioned that a local network is operated flexibly so as not to synchronize uplink and downlink transmission timings with a carrier network, such as increasing uplink slots when an uplink communication demand is high in the local network. In order to perform such flexible operation, a technique for suppressing an effect of interference between networks becomes important (see the specification of US-2020-0008087).

SUMMARY OF THE INVENTION

The present invention provides a technique that enables flexible operation of a network while suppressing interference between networks.

According to one aspect of the present invention, there is provided a control method to be executed by a control apparatus, the method comprising: in a case where, in a first network, a first pattern, in which each of time division duplex (TDD) time slots is assigned to uplink or downlink which is a direction of communication between a base station and a terminal, is used and, in a second network that is different from the first network, the first pattern and a second pattern that is different from the first pattern in assignment of the direction of communication to the time slots can be used for communication by TDD between a base station and a terminal, based on that a predetermined condition has been satisfied, controlling a base station belonging to the second network so as to use time slots in which the direction of communication that has been assigned coincides between the first pattern and the second pattern and not to use time slots in which the direction of communication that has been assigned does not coincide.

According to one aspect of the present invention, there is provided a control method to be executed by a base station belonging to a second network that is different from a first network, in which a first pattern in which each of time division duplex (TDD) time slots is assigned uplink or downlink which is a direction of communication, is used, the method comprising: when performing communication by TDD with a terminal, in a case where, in the second network, the first pattern and a second pattern that is different from the first pattern in assignment of the direction of communication to time slots can be used, based on that a predetermined condition has been satisfied, controlling so as to use time slots in which the direction of communication that has been assigned coincides between the first pattern and the second pattern and not to use time slots in which the direction of communication that has been assigned does not coincide.

According to one aspect of the present invention, there is provided a control method to be executed by a base station belonging to a second network that is different from a first network, in which a first pattern in which each of time division duplex (TDD) time slots is assigned uplink or downlink which is a direction of communication, is used, the method comprising: when performing communication by TDD with a terminal, in a case where, in the second network, the first pattern and a second pattern that is different from the first pattern in assignment of the direction of communication to time slots can be used and another base station of the second network does not use a first time slot in which the direction of communication does not coincide between the first pattern and the second pattern and uses second time slots in which the direction of communication that has been assigned coincides, controlling so as to limit, among the second time slots in the second pattern, use of a third time slot in which the direction of the communication is the same as in the first time slot.

Further features of the present invention will become apparent from the following description of exemplary embodiments (with reference to the attached drawings).

BRIEF DESCRIPTION OF THE DRAWINGS

FIG. 2 is a diagram illustrating an example of a configuration of TDD time slots that can be used in a local network.

DESCRIPTION OF THE EMBODIMENTS

Figure 1:
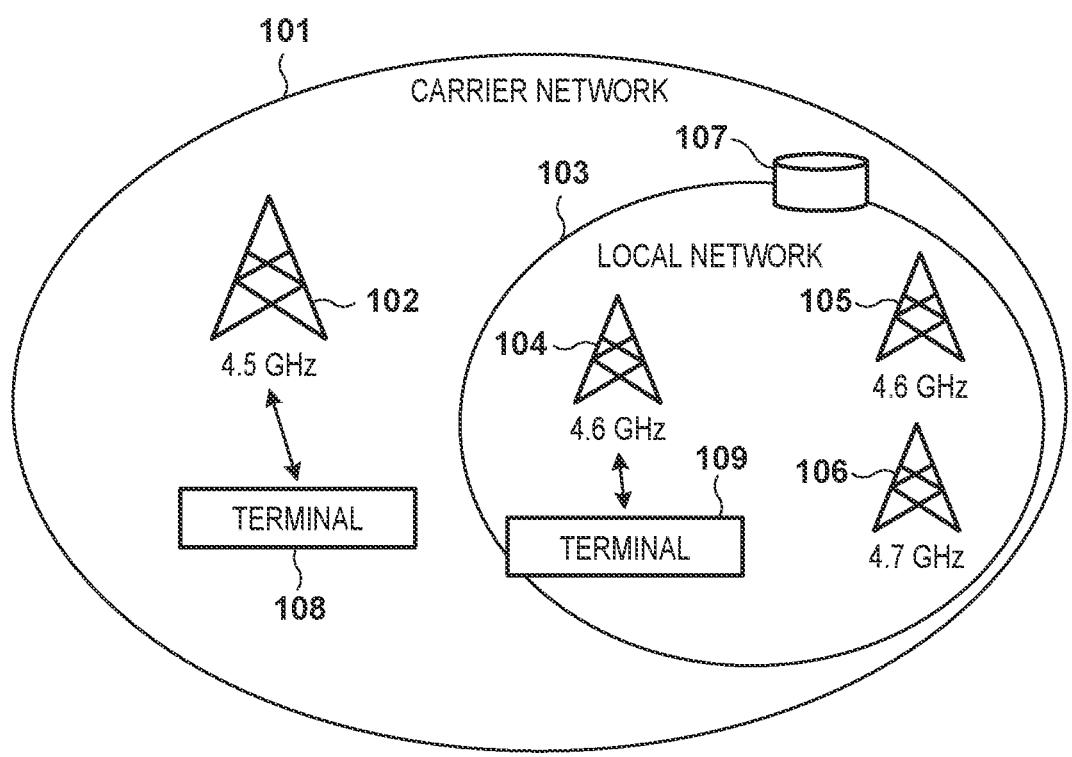
FIG. 1 is a diagram illustrating an example of a configuration of a system.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

(System Configuration)

FIG. 1 illustrates an example of a configuration of a system according to the present embodiment. The system according to the present embodiment is configured to include a plurality of networks. Here, the plurality of networks are all cellular communication networks conforming to a cellular communication standard of the 3rd Generation Partnership Project (3GPP). A first network is a carrier network 101 provided nationwide by a wireless communication operator, and a second network is a local network 103 provided locally by a regional body, company, or the like. These are examples, and the following discussion can be applied in any system in which a plurality of TDD systems in which frame timings are synchronized coexist. The local network 103, in one example, is configured inside an area in which the carrier network 101 is deployed. That is, the local network 103 is deployed in an overlapping area inside the area in which the carrier network 101 is deployed. These are only examples, and the following discussion may be applied to other types of wireless communication networks. In the present embodiment, it is assumed that the carrier network 101 and the local network 103 are operated using adjacent frequency bands. For example, FIG. 1 illustrates an example in which the carrier network 101 uses a 4.5-GHz band, and the local network 103 uses a 4.6-GHz band and a 4.7-GHz band. In this embodiment, it is assumed that a base station 104 and a base station 105 of the local network 103 uses the 4.6-GHz band and a base station 106 uses the 4.7-GHz band which is adjacent to the 4.6-GHz band.

In the carrier network 101, a wireless communication service is provided to a terminal 108 of a user, who has signed a contract with a wireless operator, in an area where wireless communication with a base station 102 for providing a communication service of the carrier network 101 can be performed. The base station 102 of the carrier network 101 is connected to a core network (not illustrated), and mobility management, session management, and the like are performed by a node in the core network. Similarly, in the local network 103, a wireless communication service is provided to a terminal 109 provided for local network communication in an area of the local network 103 where wireless communication with any of the base stations 104 to 106 can be performed. Here, in the present embodiment, it is assumed that the carrier network 101 is a network to be prioritized, and the local network 103 performs communication after performing processing such that there is no or a sufficiently small level of interference on the communication of the carrier network 101. Mobility management and session management of the local network 103 are performed by a node 107 in a core network independent of the core network of the carrier network 101.

It is conceivable that the carrier network 101 and the local network 103 each communicate at their own timing. In this case, even if the carrier network 101 and the local network 103 communicate using, for example, orthogonal frequency division multiplexing (OFDM) in which orthogonality can be mutually guaranteed, orthogonality may not be guaranteed due to radio frame timings not coinciding, and they may interfere with each other. This interference can be suppressed, for example, by causing the base stations 104 to 106 to transmit and receive radio frames in synchronization with the base station 102 of the carrier network 101 to match the timings of the radio frames.

There are a plurality of patterns for a situation where they may interfere with each other. For example, interference by the carrier network 101 on the local network 103 may include (1) interference by the base station 102 on the base stations 104 to 106, and (2) interference by the base station 102 on the terminal 109. There is also a pattern for interference by the carrier network 101 on the local network 103 that includes (3) interference by the terminal 108 on the base stations 104 to 106, and (4) interference by the terminal 108 on the terminal 109. Interference by the local network 103 on the carrier network 101 may also include (5) interference by the base stations 104 to 106 on the base station 102, and (6) interference by the base stations 104 to 106 on the terminal 108. Interference by the local network 103 on the carrier network 101 may also include (7) interference by the terminal 109 on the base station 102, and (8) interference by the terminal 109 on the terminal 108. At this time, assuming that the local network 103 is subordinate to the carrier network 101, the interference of (1) to (4) is allowed to a certain extent, and the local network 103 can perform processing to reduce the effects of this interference. On the other hand, since the interference of (5) to (8) is interference on the preferred network, the local network 103 must prevent or sufficiently suppress such interference.

In one example, the interference of (5) can be sufficiently suppressed by the base stations 104 to 106 of the local network 103 transmitting signals al the timing at which the signals are transmitted by the base station 102 of the carrier network 101. Further, by varying a frequency band in which a signal is transmitted and received by the base station 102 of the carrier network 101 and a frequency band in which a signal is transmitted and received by the base stations 104 to 106 of the local network 103, it is possible to suppress the interference of (6) and (7) to be sufficiently small. The interference of (8) can also be sufficiently suppressed by the terminal 109 of the local network 103 transmitting a signal at a timing at which a signal is transmitted by the terminal 108 of the carrier network 101.

Meanwhile, in recent cellular communication standards, a time division duplex (TDD) scheme in which a ratio of downlink, in which a signal is transmitted from a base station to a terminal, to uplink, in which a signal is transmitted from a terminal to a base station, can be flexibly changed has been standardized. The TDD scheme is a scheme in which uplink and downlink communication is performed using a common frequency band and assigns each of a plurality of time slots divided by a unit time to either uplink or downlink. Because there is a high demand for downlink communication in general, the carrier network 101 tends to assign many time slots for downlink. On the other hand, it is anticipated that the local network 103 necessitates more time slots for uplink than the carrier network 101 depending on its application. In this case, the local network 103 can assign time slots to uplink or downlink independently of uplink and downlink assignment of time slots for the carrier network 101 (see the specification of U.S. Pat. Pub. No. 2020/0008087). However, in this case, the above-described interference of (5) and (8) occurs.

To deal with this, it is possible to use the assignment of the time slots of the carrier network 101 in the local network 103 after changing only some of the assignment of the time slots. In one example, it is possible to perform setting in which only some of the slots assigned to uplink in the carrier network 101 are assigned to downlink, and the slots assigned to downlink in the carrier network 101 are used as is for downlink. It is also possible to perform setting in which only some of the slots assigned to downlink in the carrier network 101 are assigned to uplink, and the slots assigned to uplink in the carrier network 101 are used as is for uplink. According to the former setting, while downlink communication is being performed in the carrier network 101, since the terminal 109 does not transmit a signal, it is possible to suppress the interference of (8). On the other hand, according to the latter setting, since the base stations 104 to 106 do not transmit a signal while uplink communication is being performed in the carrier network 101, it is possible to suppress the interference of (5).

Here, from the viewpoint of protection of the base station 102 of the carrier network 101, a case of using a setting such that there is no interference of (5) will be considered. An example of a time slot setting that can be used in the local network 103 in this case is illustrated in FIG. 2. Here, a pattern for assignment of time slots in which a setting of uplink and downlink time slots coincides with that of the carrier network 101 is called a synchronous TDD pattern. On the other hand, a pattern for assignment of time slots in which some of the directions (uplink or downlink) of communication are changed from the assignment of time slots of the carrier network 101 is called a semi-synchronous TDD communication. In this embodiment, as illustrated in FIG. 2 in particular, communication in which a TDD pattern, in which a time slot assigned to downlink in a time slot of the carrier network 101 is set as uplink, is used in the local network 103 is referred to as a semi-synchronous TDD. In FIG. 2, a time slot assigned to uplink communication is indicated by "U", a time slot assigned to downlink communication is indicated by "D", and a time slot indicating a period in which a switch is made from downlink to uplink is indicated by "S".

In the present embodiment, it is assumed that communication is performed in the carrier network 101 in accordance with the synchronous TDD pattern of FIG. 2. However, FIG. 2 is only an example, and it may be acceptable to use any of a plurality of TDD settings in the carrier network 101. On the other hand, it is assumed that the local network 103 uses a synchronous TDD pattern, which is the same TDD pattern as that of the carrier network 101, and a semi-synchronous TDD pattern, in which a time slot assigned to downlink has been set to uplink in a time slot of the carrier network 101.

In the present embodiment, it is assumed that the base stations 104 to 106 of the local network are normally operated in a semi-synchronous TDD pattern for low-latency communication or high-speed uplink communication. Meanwhile, the base stations 104 to 106 of the local network may be operated by being switched from the semi-synchronous TDD pattern to the synchronous TDD pattern if it interferes with the carrier network 101. For example, if the terminal 109 that is connected to the base station 104 that is being operating by the semi-synchronous TDD pattern interferes with the terminal 108 of the carrier network, the base station 104 is changed to operate in a synchronous TDD pattern.

In this case, in the local network 103, the base station 104 is operated in the synchronous TDD pattern and the base station 105 and the base station 106 are operated in the semi-synchronous TDD pattern. As a result, within the local network 103, the downlink communication of the base station 104 and the uplink communication of the base station 105 and the base station 106 may interfere with each other. Then, as a result, for example, it may no longer be possible to satisfy the requirements of execution throughput and delay time in the uplink communication of the base station 105 and the base station 106 that are being operated in the semi-synchronous TDD pattern.

In this embodiment, in view of such circumstances, a technique for suppressing the effects of interference based on the TDD pattern used in each base station is performed by the base stations 104 to 106 of the local network 103. Specifically, based on a predetermined condition, the base stations 104 to 106 use time slots in which the directions (uplink or downlink) of communication coincide between the first pattern and the second pattern of TDD and do not use time slots in which the directions of communication do not coincide. For example, when the synchronous TDD pattern and the semi-synchronous TDD pattern of FIG. 2 are used, the base stations 104 to 106 for which the predetermined condition is satisfied do not use the time slots whose time slot numbers are 8, 9, 18, and 19 and communicate in the remaining time slots. The predetermined condition may be, for example, operation by the synchronous TDD pattern. The predetermined condition may also be that there the base stations 104 to 106 or a connected terminal is at a position that may interfere with the carrier network 101. The predetermined condition may also include, in addition to the conditions described above, that there is another base station nearby operating by the same or adjacent frequency using a semi-synchronous TDD pattern.

Assuming that there is another base station in which some time slots are not used as described above, the base stations 104 to 106 may preferentially use the time slots that are not used by the other base station so that the communication efficiency of the other base station will not be degraded. The base stations 104 to 106 then specify the direction of communication in the semi-synchronous TDD pattern for the time slots not used by the other base station while operating by the semi-synchronous TDD pattern. Then, the base stations 104 to 106 limit the use of the time slots to be used by the other base station among the time slots assigned in those directions of communication. For example, according to the method described above, the other base station does not use time slots whose time slot numbers are 8, 9, 18 and 19, but the direction of communication of the semi-synchronous TDD pattern in those time slots is uplink. The base stations 104 to 106 then limit their use of time slots that are assigned to uplink in the semi-synchronous TDD pattern and whose time slot numbers are 4, 5, 14, and 15, which are to be used by the other base station. The limitations include non-use and use only at the time of retransmission of data. By this, on the occasion that another base station performs a first communication in uplink, it is possible to reduce the probability that a second communication of the base stations 104 to 106 will interfere with that first communication.

In the following, examples of a configuration of an apparatus for performing such processing and a flow of processing will be described with reference to the drawings.

(Apparatus Configuration)

Figure 3:
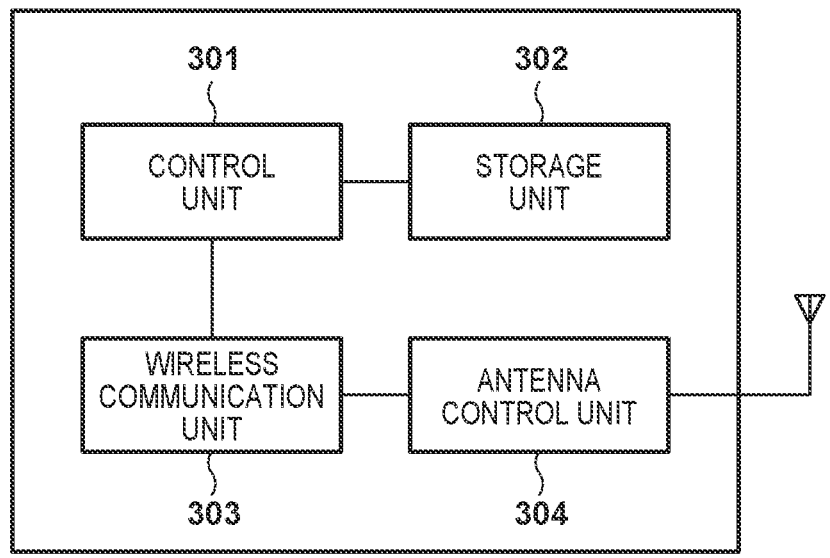
FIG. 3 is a diagram illustrating an example of a hardware configuration of a base station apparatus.

FIG. 3 illustrates an example of hardware configuration of the base stations 104 to 106 of the local network 103. The base stations 104 to 106 include, for example, a control unit 301, a storage unit 302, a wireless communication unit 303, and an antenna control unit 304 as their hardware configurations.

The control unit 301 is configured to include one or more processors such as a CPU (Central Processing Unit) and an MPU (Micro Processing Unit), for example. The control unit 301 may be configured to include a digital signal processor (DSP), a field programmable gate array (FPGA), an application-specific integrated circuit (ASIC), or the like. A storage unit 302 stores a control program to be executed by the control unit 301 and various types of information such as control parameters, a TDD pattern to be used, and connection terminal information. The control unit 301 controls the entire device, for example, by executing the control program stored in the storage unit 302. Further, in one example, various operations to be described later are realized by the control unit 301 executing the control program stored in the storage unit 302.

The wireless communication unit 303 is configured to include a circuit for performing communication conforming to 3GPP cellular communication standards, such as the fifth generation (5G) new radio (NR) and long-term evolution (LTE) conforming to 3GPP standards. The wireless communication unit 303 is configured to include, for example, a baseband chip or an RF (Radio Frequency) chip. The antenna control unit 304 controls an antenna for wireless communication by the wireless communication unit 303. The antenna control unit 304 may be included in the wireless communication unit 303 or may be separately present from the wireless communication unit 303. The antenna controlled by the antenna control unit 304 may be an antenna capable of operation, for example, in both of the frequency bands that may be and can be used by the carrier network 101 and the local network 103, respectively. However, this is only an example, and the antenna may be, for example, an antenna that is operable only in the frequency band of the local network 103, or an antenna that is also operable in another frequency band.

Figure 4:
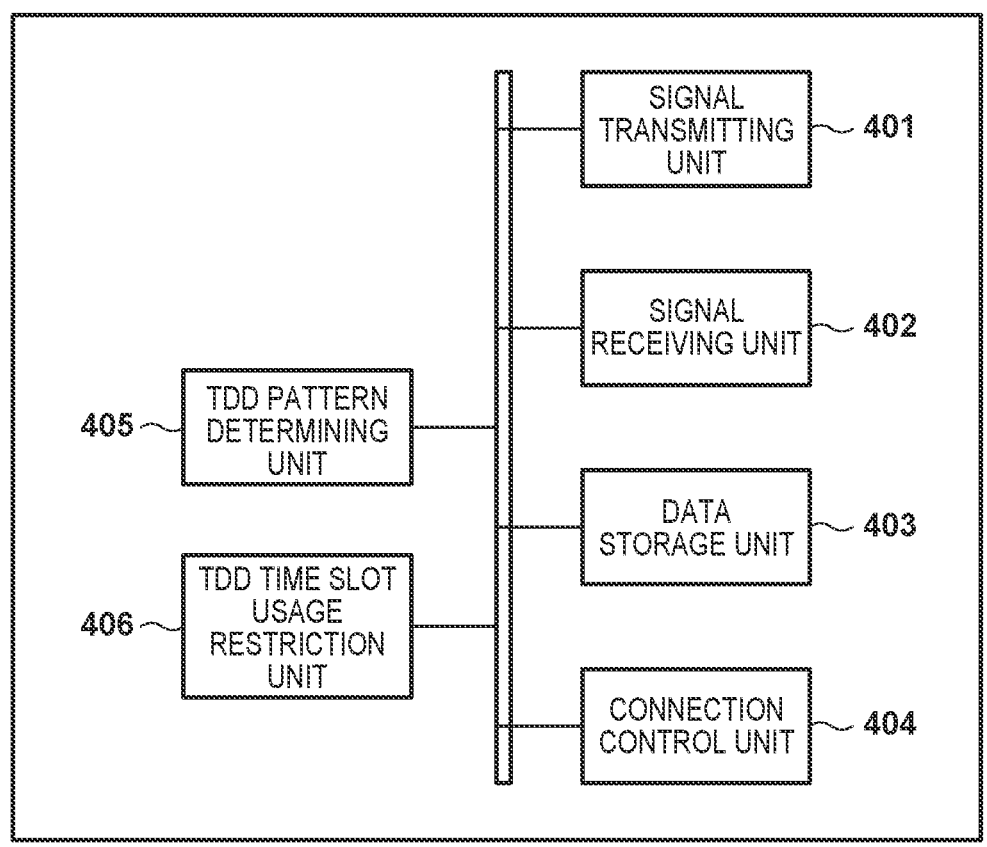
FIG. 4 is a diagram illustrating am example of a functional configuration of the base station apparatus.

FIG. 4 is a diagram illustrating an example of a functional configuration of a base station apparatus according to the present embodiment. The base station device has, as an example of its functional configuration, a signal transmitting unit 401, a signal receiving unit 402, a data storage unit 403, a connection control unit 404, a TDD pattern determining unit 405, and a TDD time slot usage restriction unit 406. These functional configurations may be realized, for example, by the control unit 301 executing a program stored in the storage unit 302. The signal transmitting unit 401 and the signal receiving unit 402 transmit and receive signals having a frame configuration defined in a 3GPP cellular communication standard. The data storage unit 403 stores software corresponding to the control to be executed, information related to cellular communication, and the like. The data storage unit 403 may, for example, store information on an operation mode currently being used (a TDD pattern being used) in the base station, as will be described later. The connection control unit 404 performs, with a terminal, processing related to connection and disconnection of the terminal to the cellular network, such as communication of radio resource control (RRC) messages. The connection control unit 404 may also perform processing related to connection with a core network function.

The TDD pattern determining unit 405 determines the TDD pattern to be operated. The TDD pattern determining unit 405, for example, when a connected first terminal detects a radio wave from a second terminal of the carrier network 101, determines that an uplink signal by the first terminal may interfere with the second terminal and determines to use the synchronous TDD pattern. Further, the TDD pattern determining unit 405, even when a radio wave from the second terminal is detected in the base station apparatus itself, may determine to use the synchronous TDD pattern. These are only examples, and when it is determined that a situation in which interference may occur with respect to the second terminal when the semi-synchronous TDD pattern is used, the TDD pattern determining unit 405 may determine to use the synchronous TDD pattern. Further, the TDD pattern determining unit 405 may determine to use the synchronous TDD pattern when the uplink communication frequency is low and the uplink communication demand can be satisfied even if the synchronous TDD pattern is used. When the synchronous TDD pattern is not used, the TDD pattern determining unit 405 determines to use the semi-synchronous TDD pattern. That is, the TDD pattern determining unit 405 may determine to use a TDD pattern in which some of the time slots assigned to downlink in the synchronous TDD pattern are assigned to uplink. The TDD pattern determining unit 405 may determine to use a. TDD pattern in which time slots that are uplink in the synchronous TDD pattern are assigned to downlink on the condition that the interference on the base station 102 of the carder network 101 can be sufficiently suppressed. The TDD pattern determining unit 405 notifies the determined TDD pattern to the connection control unit 404.

The TDD time slot usage restriction unit 406 executes processing related to the restriction on the use of a predetermined TDD time slot to be described later.

(Processing Flow)

Next, an example of the flow of processing for restricting the use of a predetermined TDD time slot to be executed by the TDD time slot usage restriction unit 406 will be described with reference to FIG. 5. This processing is started at each of the base stations 104 to 106 of the local network 103, for example, when they are each connected to the node 107 of the local network 103. This processing may also be implemented by the control unit 301 of a base station of the local network 103 reading and executing a computer program stored in the storage unit 302. This is only an example, and for example, in at least one of the base stations 104 to 106 of the local network 103, dedicated hardware for performing the following processing may be used. In the following, a case where the base station 104 executes the processing will be described; however, the base station 105 and the base station 106 may also perform the same processing.

After the processing has started, the base station 104 obtains base station information on a nearby base station of the local network 103 (step S501). The base station 104 can obtain, from the nearby base station of the local network 103, the base station information on that base station using, for example, an interface between the base stations. The base station 104 may also obtain the base station information from, for example, a node in the core network. Also, a nearby base station here may be, based on a cell included in a neighboring cell list defined in 3GPP, for example, another base station that provides that cell. That is, another base station that has been determined in advance to be in a neighboring relationship is determined to be a nearby base station. Further, for example, when a transmission source of a radio wave detected by the terminal 109 connected with the base station 104 is another base station or a terminal connected to that another base station, that other base station may be treated as a nearby base station of the base station 104. If base stations in a neighboring relationship include a base station of another network such as a base station of the carrier network 101, configuration may be such that only the base stations belonging to the same local network 103 as the base station that performs this processing are extracted. In this embodiment, it is assumed that the base stations 104 to 106 are recognized to be mutually nearby. For this reason, the base station 104 obtains base station information on the base station 105 and the base station 106. The base station information includes, for example, information indicating whether that base station is operated in the synchronous TDD pattern or the semi-synchronous TDD pattern. The base station information may also include information on the frequency band being used by the base station from which the base station information is provided.

Subsequently, the base station 104 determines whether or not the base station 104 itself is currently operating by the synchronous TDD pattern (step S502). When being operated in the synchronous TDD pattern (YES in step S502), the base station 104 determines, based on the obtained base station information, whether there is a nearby base station operating by the semi-synchronous TDD pattern in a frequency band that is the same as or adjacent to that of the base station 104 itself (step S503). If it is determined that there is no such a nearby base station (NO in step S503), the base station 104 terminates the processing without special limitations such as limitations on the use of some time slots. On the other hand, when it is determined that there is such a nearby base station (YES in step S503), the base station 104 does not use a time slot in which the link directions do not coincide between the synchronous TDD pattern and the semi-synchronous TDD pattern (step S504).

For example, near the base station 104, the base station 105 is operating by the semi-synchronous TDD pattern in the same frequency band as the base station 104, and the base station 106 is operating by the semi-synchronous TDD pattern in a frequency band adjacent to the frequency band used by the base station 104. For this reason, the base station 104 does not use time slots in which the uplink and downlink directions do not coincide between the semi-synchronous TDD patterns used by these base station 105 and base station 106 and the synchronous TDD pattern. For example, if the base station 105 and the base station 106 use the semi-synchronous TDD pattern as illustrated in FIG. 2, the base station 104 will not use time slots whose time slot numbers are 8, 9, 18, and 19. In other words, the base station 104 uses time slots in which the communication directions coincide between the synchronous TDD pattern and the semi-synchronous pattern as they are and operates in accordance with a new TDD pattern in which time slots in which the communication directions do not coincide are made blank. This makes it possible for the communication of the base station 104 to not interfere with the communication of the carrier network 101 that is using the synchronous TDD pattern and not interfere with the communication of the base station 105 and the base station 106 of the local network 103 that are using the semi-synchronous TDD pattern. This makes it possible, for example, in the uplink communication of the base station 105 and the base station 106, to suppress the probability that an error may occur, which makes it possible to reduce communication latency.

The processing so far is the processing to be performed by the base station 104 operating using the synchronous TDD pattern. If such a base station 104 is present, the base station 105 and base station 106 nearby operating by the semi-synchronous TDD pattern may perform processing assuming the processing of the base station 104 as described above.

For example, when it is determined that the base station 105 itself is operating by the semi-synchronous TDD pattern (NO in step S502), the base station 105 determines whether there is a nearby base station operating by the synchronous TDD pattern in the same frequency band as the base station 105 itself (step S505). In step S501, the base station 105 obtains the base station information of the base station 104 and determines that the base station 104 is operating by the synchronous TDD pattern on the same frequency as the base station 105 itself (YES in step S505). In this case, the base station 105 may operate so as to restrict the use of uplink time slots by both the synchronous TDD pattern and the semi-synchronous TDD pattern. That is, the base station 105 restrict the use of time slots whose time slot numbers are 4, 5, 14, and 15. Since the base station 104 stops the use of time slots whose time slot numbers are 8, 9, 18, and 19, this is processing for enabling the base station 104 to reliably perform uplink communication. That is, if the base station 105 uses time slots whose time slat numbers are 4, 5, 14, and 15, it may interfere with the uplink communication of the base station 104; therefore, the use of some time slots is limited to suppress this interference. For example, the base station 105 may transmit retransmission data only in the time slots whose time slot numbers are 4, 5, 14, and 15 (step S506), That is, the base station 105 does not use time slats whose time slot numbers are 4, 5, 14, and 15 if communication is successful in time slots whose time slot numbers are 8, 9, 18, and 19. Configuration may be taken so that the base station 105 also does not use time slots whose time slot numbers are 4, 5, 14, and 15 for retransmission. Thus, it is possible to improve the success rate of uplink communication of the base station 104 communicating in the synchronous TDD pattern.

Meanwhile, when it is determined that the base station 106 itself is operating by the semi-synchronous TDD pattern (NO in step S502), the base station 106 determines that there is no nearby base station operating by the synchronous TDD pattern in the same frequency band as the base station 106 itself (NO in step S505). This is because the frequency band used by the base station 106 is different from the frequency band used by the base station 104. In this case, even if the base station 106 uses the time slots whose time slot numbers are 4, 5, 14, and 15, it is assumed that the interference on the communication of the base station 104 is limited. Therefore, the base station 106 ends the processing without any particular limitation on the time slots to be used. Configuration may be taken so that the base station 106 also does not use time slots whose time slot numbers are 4, 5, 14, and 15 or only retransmits data in these time slots.

In the present example of the processing, it is assumed that the processing of step S504 and step S506 is executed to reduce errors in the uplink time slots in the local network 103, but configuration may be such that only one of these processes is performed. Further, the base station 104 operating by the synchronous TDD pattern may perform the processing of step S504 without performing the determination processing of step S503.

By each base station of the local network 103 autonomously limiting the use of some time slots as described above, the occurrence of interference within the local network 103 can be suppressed while preventing interference on the carrier network 101. Furthermore, by partially limiting uplink communication in the semi-synchronous TDD pattern within the local network 103, interference on the base station operating by the synchronous TDD pattern can be suppressed and the efficiency of uplink communication can be improved.

<Variation>

It is assumed that the example of the above-described processing is respectively executed by each base station in the local network 103, but the present invention is not limited to this. In the present variation, a case where the node 107 on the core network to which each base station of the local network 103 is connected performs the processing of controlling the base stations such as setting time slots in which communication is to be suppressed will be described. The configuration of the node 107 is generally the same as the configuration of the base station (the configuration of FIGS. 3 and 4). However, since the node 107 is typically connected to each base station using a wired line, the wireless communication unit 303 can be replaced with a communication unit for performing wired communication or the like, and the antenna control unit 304 and the antenna, for example, can be replaced with an interface for wired communication. Further, the signal transmitting unit 401, the signal receiving unit 402, and the connection control unit 404 of the node 107 is configured to, for example, perform communication in the core network in accordance with the 5G core standard (5GC) and perform management for connection/disconnection with each base station and communication with each base station. Further, the TDD pattern determining unit 405 and the TDD time slot usage restriction unit 406 collectively perform processing for each of the base stations to be controlled by the node 107. The node 107 performs the above-described processing using such a configuration, comprehensively for a plurality of base stations in the local network 103.

An example of a flow of processing to be performed in the node 107 will be described with reference to FIG. 6. This processing is performed in response to the connection of a base station, such as the base stations 104 to 106, to the local network 103. For example, the node 107 recognizes, by monitoring a predetermined node or the like, that a base station is connected to the local network 103 and that the various settings as a base station of the local network 103 have been completed and then starts the processing of FIG. 6. A base station may also start the processing by connecting to the node 107. This processing may also be implemented by the control unit 301 of the node 107 reading and executing a computer program stored in the storage unit 302.

Figures 6, 7:
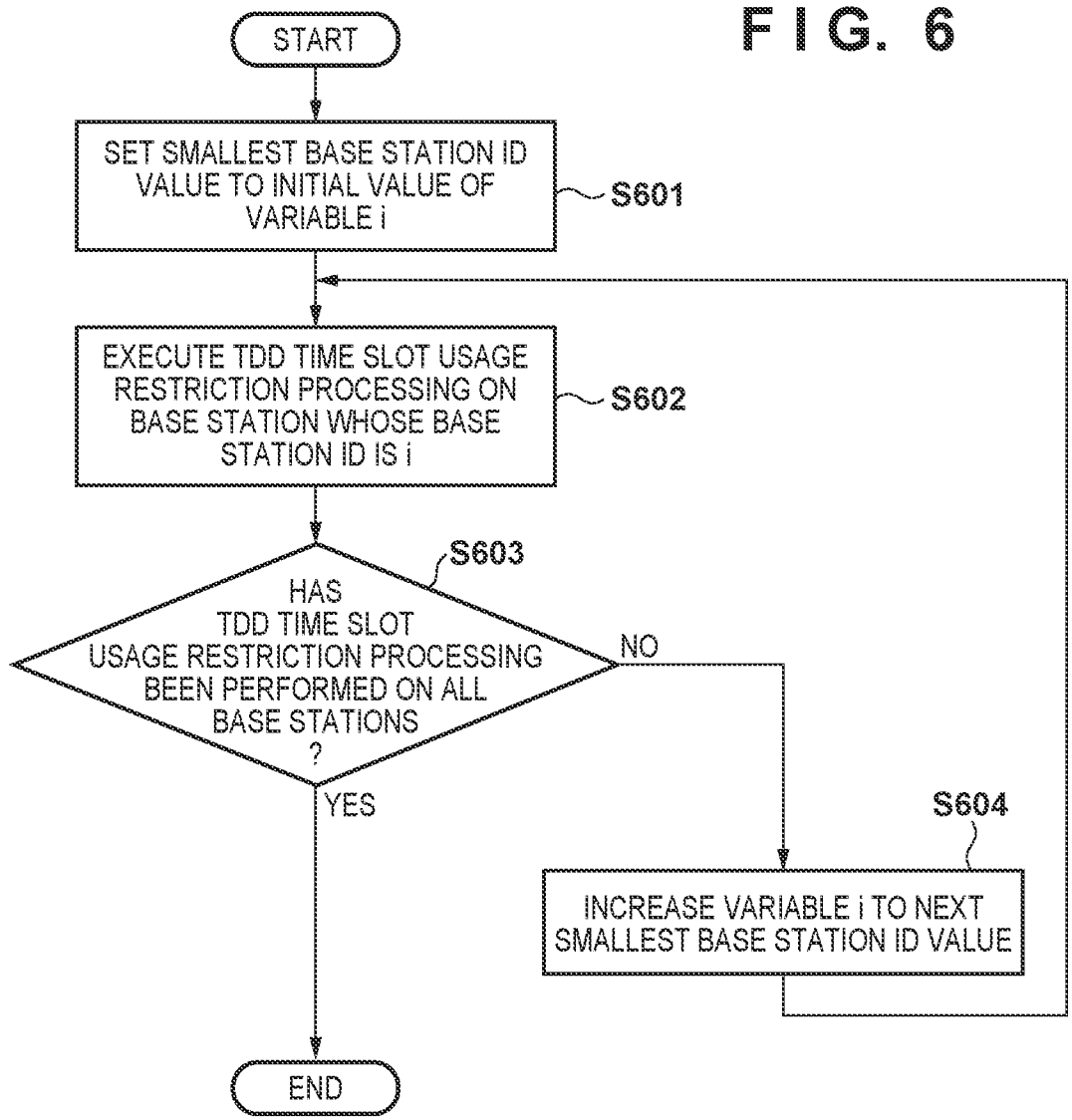
FIG. 6 is a diagram for explaining an example of a flow of processing performed by a node in a core network of the local network.
FIG. 7 is a diagram illustrating an example of base station information to be used by the node in the core network of the local network.

The node 107 can obtain base station information on each base station at the time of connection of the base station, that is, prior to the start of the processing of FIG. 6. The base station information may include, for example, base station identification information (a base station ID) and neighboring base station information (a base station ID of a base station providing a neighboring cell). The base station information may also include information on the frequency band to be used. When the node 107 determines the frequency band to be used in each base station, the base station information need not include this information. In addition, if a base station determines the TDD pattern, information indicating which of the synchronous TDD pattern and the semi-synchronous TDD pattern each base station is operating in accordance with may be included. When the node 107 determines which of the synchronous TDD pattern and the semi-synchronous TDD pattern each base station uses, the base station information need not include this information. FIG. 7 illustrates an example of the base station information obtained by the node 107 in the present embodiment. In the example of FIG. 7, it is assumed that the base station ID of the base station 104 is 104, the base station ID of the base station 105 is 105, and the base station ID of the base station 106 is 106. As illustrated in FIG. 7, this base station information indicates that the base stations 104 to 106 are in a relationship in which they are near each other and that only the base station 104 is operating in accordance with the synchronous TDD pattern.

In the processing of FIG. 6, the node 107 first determines the base station having the smallest value for base station ID as the first base station to be processed (step S601). In this example of the processing, the base stations to be processed are selected in order from the smallest value of the base station ID, but this is only an example, and another order may be used. For example, the base stations to be processed may be selected in order from the largest value of the base station ID. Further, by assigning serial numbers to the base stations to be processed in accordance with an arbitrary rule, the processing may be executed in order of serial numbers. The serial numbers may be assigned in any order, such as in order from the smallest/largest IP address attached to the base station, in order of installation of the base station, or in order from the highest/lowest performing base station, for example.

Next, the node 107 executes TDD time slot usage restriction processing, which will be described later, to the first base station to be processed selected in step S601 (step S602). Then, the node 107 determines whether the processing of step S602 has been executed for all the base stations to be processed (step S603) and, when it has not been executed (NO in step S603), selects the next base station to be processed and executes the processing of step S602 (step S604). On the other hand, when it is determined that the processing of step S602 has been executed for all the base stations to be processed (YES in step S603), the node 107 terminates the processing.

Figure 5:
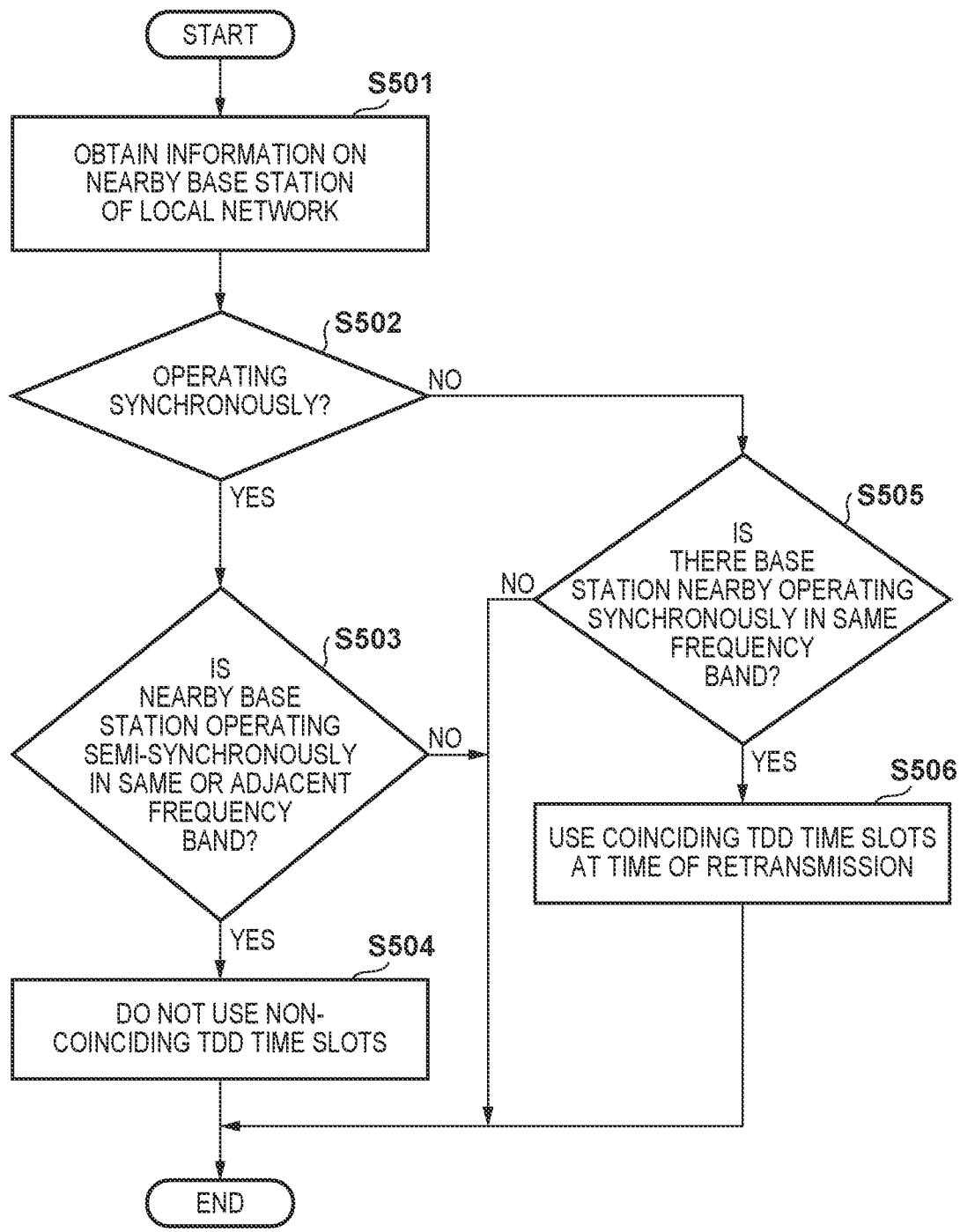
FIG. 5 is a diagram for explaining an example of a flow of processing performed by a base station of the local network.

The processing to be executed in step S602, for example, is performed as illustrated in FIG. 5. That is, the node 107 first obtains information on a base station of the local network 103 near the base station to be processed (step S501). Then, when the base station to be processed is operating by the synchronous TDD pattern (YES in step S502), the node 107 determines whether there is a base station nearby operating by the semi-synchronous TDD pattern in a frequency band that is the same as or adjacent to that of the base station to be processed (step S503). If such a nearby base station (YES in step S503), the node 107 determines so as not to allow the base station to be processed to use the time slots in which uplink and downlink directions are different between the synchronous TDD pattern and the semi-synchronous TDD pattern (step S504). On the other hand, if there is no such a nearby base station (NO in step S503), the node 107 terminates the processing without setting a time slot in which usage is specifically limited for the base station to be processed. In addition, when the base station to be processed is operating by the semi-synchronous TDD pattern (NO in step S502), the node 107 determines whether there is a nearby base station operating by the synchronous TDD pattern in the same frequency band as the base station to be processed (step S505). Then, if such a nearby base station is present (YES in step S505), the node 107 limits use of the time slots in which uplink and downlink directions coincide between the synchronous TDD pattern and the semi-synchronous TDD pattern by the base station to be processed (step S506). On the other hand, if there is no such nearby base station (NO in step S505), the node 107 terminates the processing without setting a time slot in which usage is specifically limited for the base station to be processed.

In the example of the processing in FIG. 6, the node 107 first sets the base station 104 as the base station to be processed. The base station 104 is operating by the synchronous TDD pattern, and the base station 105 and the base station 106 operating by the semi-synchronous TDD pattern in the same or adjacent frequency band are present near the base station 104. Therefore, the node 107 determines not to use the time slots whose time slot numbers are 8, 9, 18, and 19 for the base station 104. Next, the node 107 sets the base station 105 as the base station to be processed. The base station 105 is operating by the semi-synchronous TDD pattern, and the base station 104 operating by the synchronous TDD pattern in the same frequency band is present near the base station 105. Therefore, the node 107 limits the use of uplink time slots in both the synchronous TDD pattern and the semi-synchronous TDD pattern for the base station 105, such as allowing the use of time slots whose time slot numbers are 4, 5, 14, and 15 only during retransmission. Lastly, the node 107 sets the base station 106 as the base station to be processed. The base station 106 is operating by the semi-synchronous TDD pattern, and there is no base station operating using the synchronous TDD pattern in the same frequency band near the base station 106. Thus, node 107 does not impose any special limitations on the base station 106.

In the present example of the processing, it is assumed that the processing of step S504 and step S506 is executed to reduce errors in the uplink time slots in the local network 103, but only one of the processing may be performed. Further, the base station 104 operating by the synchronous TDD pattern may perform the processing of step S504 without performing the determination processing of step S503.

By limiting the use of some time slots by each base station of the local network 103 as described above, the node 107 can suppress the occurrence of interference within the local network 103 while preventing interference on the carrier network 101. Furthermore, by partially limiting uplink communication in the semi-synchronous TDD pattern within the local network 103, interference on the base station operating by the synchronous TDD pattern can be suppressed and the efficiency of uplink communication can be improved.

Figure 8:
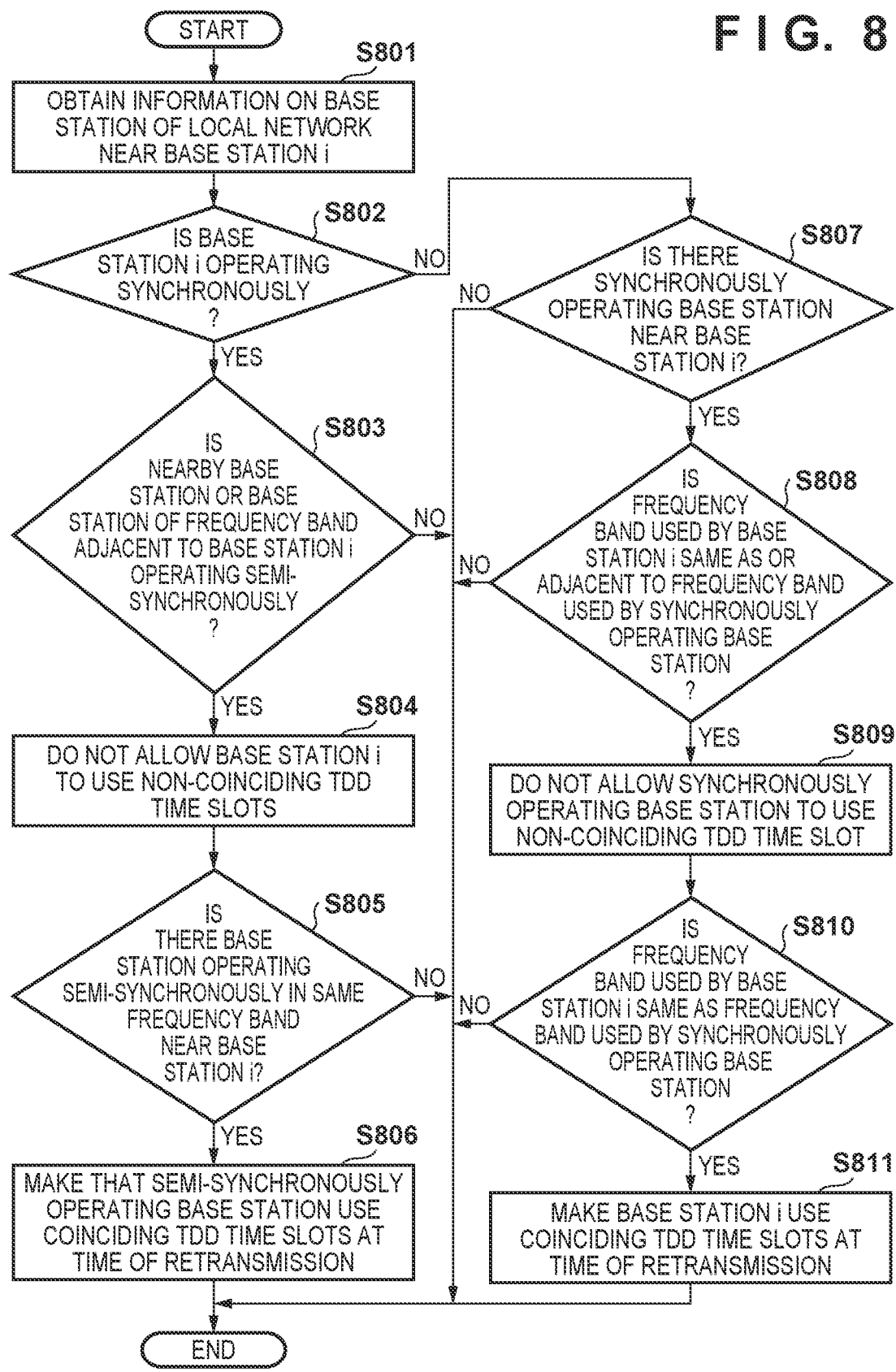
FIG. 8 is a diagram for explaining an example of a flow of processing performed by the node in the core network of the local network.

In the above-described processing, the base stations to be processed have been selected one by one, the flow of processing for determining whether or not to limit the use of time slots for that single base station and the content of usage limitation has been described, but the present invention is not limited to this. For example, processing may be performed collectively for a plurality of base stations in a relationship in which they are near each other. A flow of the processing in this case is indicated in FIG. 8.

The processing from step S801 to step S804 is similar to step S501 to step S504. That is, based on the information of the base station to be processed, if that base station is operating by the synchronous TDD pattern and there is a base station operating using the semi-synchronous TDD pattern in the same or adjacent frequency band nearby, the node 107 limits the communication of the base station to be processed. At this time, the node 107 collectively executes the limitation processing also for the base station operating by the semi-synchronous TDD pattern near the base station to be processed. That is, node 107 specifies the base station operating by the semi-synchronous TDD pattern and operating in the same frequency band near the base station to be processed (step S805). If there is such a base station (YES in step S805), the node 107 limits the use of uplink time slots in common between the synchronous TDD patterns and the semi-synchronous TDD patterns for that base station as in step S506 (step S806).

For example, while performing the processing on the base station 104, the node 107 determines the limitation on the use of time slots in the base station 104 in step S801 to step S804 and determines the limitation on the use of time slots in the base station 105 in step S806. The node 107 does not impose limitations on the use of time slots on the base station 106 in step S806 in the relationship with the base station 104. Thereafter, the node 107 does not execute the processing of FIG. 8 for the base station 105, even if the processing has not yet been executed. That is, the base station that has been the target of processing in step S806 is excluded from the base stations to be processed. The node 105 is also excluded from targets to be processed in step S806 in the processing related to other base stations. According to this, since it is possible to reduce the number of base stations to be processed, it is possible to reduce the processing load. On the other hand, although limitations on the use of time slots are not performed in the relationship with the base station 104, since there is a possibility that limitations on the use of time slots are imposed in the relationship with other base stations, the base station 106 remains as a base station to be processed. Thus, it is possible to perform processing without omission for all the base stations to be processed.

In addition, when the base station to be processed is operating by the synchronous TDD pattern (NO in step S802), the node 107 determines whether there is another base station operating by the semi-synchronous TDD pattern in the same or adjacent frequency band near that base station (step S807, step S808). Then, if there is such another base station (YES in step S807, YES in step S808), the node 107 imposes limitations on the use of time slots as in step S504 on this other base station (step S809). Also, if the frequency band used by this another base station is the same as the frequency band used by the base station to be processed (YES in step S810), limitations on the use of time slots as in step S506 is imposed on the base station to be processed (step S811).

For example, if the node 107 selects the base station 105 as the base station to be processed first, there is the base station 104 operating using the synchronous TDD pattern in the same frequency band near the base station 105. Thus, the node 107 imposes limitations on the use of time slots in step S809 on the base station 104 and also imposes limitations on the use of time slots in step S811 on the base station 105. For example, if the node 107 selects the base station 106 as the base station to be processed first, there is the base station 104 operating using the synchronous TDD pattern in an adjacent frequency band near the base station 106. The node 107 therefore imposes limitations on the use of time slots on the base station 104 in step S809. In this case, since the frequency bands to be used in the base station 104 and the base station 106 are different, the processing of step S811 is not performed. After this processing, the node 107 does not execute the processing of FIG. 8 for the base station 104, even if the processing has not yet been executed. That is, the base station that has been the target of processing in step S809 is excluded from the base stations to be processed. The base station 104 is also excluded from targets to be processed in step S809 in the processing related to other base stations. For example, in a case where the processing on the base station 105 is first executed, and then limitations on the use of time slots on the base station 104 is imposed in step S809, when the processing is executed on the base station 106 next, the base station 104 is excluded from targets to be processed in step S809. Also, in this case, if there only other base station operating by synchronous TDD pattern is the base station 104 in step S807, the processing of step S808 may also be omitted. In this way, the processing load can be reduced.

In the above-described embodiment, for the base station operating by the semi-synchronous TDD pattern, the use of time slots whose time slot numbers are 4, 5, 14, and 15 was limited when there is a base station nearby operating by the synchronous TDD pattern using the same frequency band. However, this is only an example, and for example, the use of only some of the time slots whose time slot numbers are 4, 5, 14, and 15 may be limited. Further, for example, order of priority may be assigned to a first base station operating by the semi-synchronous TDD pattern and a second base station operating by the synchronous TDD pattern, and only when the second base station has a higher order of priority than the first base station, the limitations as described above may be performed. In addition, priorities of a plurality of levels may be assigned to respective base stations, and the number of time slots for which use is limited among time slots whose time slot numbers are 4, 5, 14, and 15 may be determined in accordance with the difference in priority. That is, the use of four time slots may be limited if a value obtained by subtracting a second value indicating the priority of a base station operating by the semi-synchronous TDD pattern from a first value indicating the priority of a base station operating by the synchronous TDD pattern is equal to or greater than a first predetermined value. Also, if the value obtained by subtracting the second value from the first value is less than the first predetermined value and is equal to or greater than a second predetermined value, the use of two time slots among the four time slots described above may be limited. Also, if the value obtained by subtracting the second value from the first value is less than the second predetermined value, none of the four time slots described above may be limited in use. In this manner, the limitations may be strengthened/relaxed in steps.

In the above-described embodiment, the limitation on uplink communication has been described, but the present invention is not limited to this. For example, if a TDD pattern with more downlink time slots than in the synchronous TDD pattern is used in the local network 103, the limitations on downlink time slots may be performed in a similar manner. That is, if there are other base station of the local network 103 operating by the semi-synchronous TDD patterns near the base stations operating in accordance with the synchronous TDD pattern in the local network 103, the use of time slots whose communication direction does not coincide may be limited. That is, configuration may be such that only the time slots in which the uplink and downlink directions coincide between the synchronous TDD pattern and the semi-synchronous TDD pattern are used, and the time slots in which they do not match are blank.

This allows for flexible operation of the local network 103 while suppressing interference between the carrier network 101 and the local network 103.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-097466, filed Jun. 10, 2021, which is hereby incorporated by reference herein in its entirety.

What is claimed is:

1. A control method to be executed by at least one control apparatus, the method comprising:
   in a case where, in a first network, a first pattern, in which each of time division duplex (TDD) time slots is assigned to uplink or downlink which is a direction of communication between a base station and a terminal, is used and, in a second network that is different from the first network, the first pattern and a second pattern that is different from the first pattern in assignment of the direction of communication to the time slots can be used for communication by TDD between another base station and a terminal, and the base station operates using the first pattern and the another base station operates using the second pattern,
   controlling the another base station belonging to the second network so as to use time slots in which the direction of communication that has been assigned coincides between the first pattern and the second pattern and not to use first time slots in which the direction of communication that has been assigned does not coincide; and
   controlling the base station belonging to the first network so as to limit use of second time slots, in which the direction of communication that has been assigned is same as the direction of communication assigned to the first time slots, among time slots different from the first time slots in the first pattern.

2. The control method according to claim 1, wherein
   the another base station is using a second frequency band that is the same or adjacent to a first frequency band being used by the base station, and
   even in a case where the base station is operating using the first pattern and the another base station of the second network that is in a mutually interfering relationship with the base station is operating by the second pattern, in a case where the another base station is not using the second frequency band, the base station is controlled so as to use, among time slots of the first pattern, time slots in which the direction of communication does not coincide with the second pattern.

3. The control method according to claim 1, wherein in a case where the base station is operating using the first pattern and there is no other base station that is in a mutually interfering relationship with the base station and operating by the second pattern, the base station is controlled so as to use, among time slots of the first pattern, time slots in which the direction of communication does not coincide with the second pattern.

4. The control method according to claim 1, wherein in a case where data transmitted in the first time slot is to be retransmitted by the base station, the base station is controlled so as to use the second time slot for the retransmission, and in a case where data transmitted in the first time slot is not to be retransmitted by the base station, the base station is controlled so as not to use the second time slot.

5. The control method according to claim 1, wherein in a case where the another base station uses the same frequency band as the base station, the another base station is controlled such that use of the second time slots is limited, and in a case where the another base station uses a frequency band that is different from the base station, the base station is controlled such that the use of the second time slots is not limited.

6. The control method according to claim 1, wherein the second pattern is a pattern in which some of time slots that are assigned to downlink in the first pattern are assigned to uplink.

7. The control method according to claim 1, wherein the first network is a cellular communication network that is provided nationwide, and the second network is a cellular communication network that is provided locally.

8. A control method to be executed by a base station belonging to a first network in which a first pattern, in which each of time division duplex (TDD) time slots is assigned uplink or downlink which is a direction of communication, is used, the method comprising:
when performing communication by TDD with a terminal,
in a case where, in a second network, the first pattern and a second pattern that is different from the first pattern in assignment of the direction of communication to time slots can be used, the base station operates using the first pattern, and another base station belonging to the second network operates using the second pattern,
controlling the another base station belonging to the second network so as to use time slots in which the direction of communication that has been assigned coincides between the first pattern and the second pattern and not to use first time slots in which the direction of communication that has been assigned does not coincide; and
controlling the base station so as to limit use of second time slots, in which the direction of communication that has been assigned is same as the direction of communication assigned to the first time slots, among time slots different from the first time slots in the first pattern.

9. The control method according to claim 8, wherein the another base station is using a second frequency band that is the same or adjacent to a first frequency band being used by the base station, and even in a case where the base station is operating using the first pattern and the another base station of the second network that is in a mutually interfering relationship with the base station is operating by the second pattern, in a case where the another base station is not using the second frequency band, the control is performed so as to use, among time slots of the first pattern, time slots in which the direction of communication does not coincide with the second pattern.

10. The control method according to claim 8, wherein in a case where the base station is operating using the first pattern and there is no other base station that is in a mutually interfering relationship with the base station and operating by the second pattern, the control is performed so as to use, among time slots of the first pattern, time slots in which the direction of communication does not coincide with the second pattern.

11. The control method according to claim 8, wherein in a case where data transmitted in the first time slot is to be retransmitted by the base station, the control is performed so as to use the second time slot for the retransmission, and in a case where data transmitted in the first time slot is not to be retransmitted by the base station, the control is performed so as not to use the second time slot.

12. The control method according to claim 8, wherein in a case where the another base station uses the same frequency band as the base station, the control is performed so as to limit use of the second time slot, and in a case where the another base station uses a frequency band that is different from the base station, the control is performed so as not to limit the use of the second time slot.

13. A control apparatus comprising:
at least one memory that stores a set of instructions; and
at least one processor that executes the instructions, the instructions, when executed, causing the control apparatus to perform operations comprising:
in a case where, in a first network, a first pattern, in which each of time slots of a time division duplex (TDD) is assigned to uplink or downlink which is a direction of communication between a base station and a terminal, is used and, in a second network that is different from the first network, the first pattern and a second pattern that is different from the first pattern in assignment of the direction of communication to the time slots can be used for communication by TDD between another base station and a terminal, and the base station operates using the first pattern and the another base station operates using the second pattern,
controlling the another base station belonging to the second network so as to use time slots in which the direction of communication that have been assigned coincide between the first pattern and the second pattern and not to use first time slots in which the direction of communication that has been assigned does not coincide; and
controlling the base station belonging to the first network so as to limit use of second time slots, in which the direction of communication that has been assigned is same as the direction of communication assigned to the first time slots, among time slots different from the first time slots in the first pattern.

14. A non-transitory computer-readable storage medium that stores a program for causing a computer included in a control apparatus to:

in a case where, in a first network, a first pattern, in which each of time slots of a time division duplex (TDD) is assigned to uplink or downlink which is a direction of communication between a base station and a terminal, is used and, in a second network that is different from the first network, the first pattern and a second pattern that is different from the first pattern in assignment of the direction of communication to the time slots can be used for communication by TDD between another base station and a terminal, and the base station operates using the first pattern and the another base station operates using the second pattern, control the another base station belonging to the second network so as to use time slots in which the direction of communication that has been assigned coincides between the first pattern and the second pattern and not to use first time slots in which the direction of communication that has been assigned does not coincide; and control the base station belonging to the first network so as to limit use of second time slots, in which the direction of communication that has been assigned is same as the direction of communication assigned to the first time slots, among time slots different from the first time slots in the first pattern.

* * * * *